United States Patent [19]

Drent et al.

[11] Patent Number: 4,474,978
[45] Date of Patent: Oct. 2, 1984

[54] PREPARATION OF CARBAMATES

[75] Inventors: Eit Drent; Petrus W. N. M. Van Leeuwen, both of Amsterdam, Netherlands

[73] Assignee: Shell Oil Company, Houston, Tex.

[21] Appl. No.: 542,805

[22] Filed: Oct. 17, 1983

Related U.S. Application Data

[63] Continuation-in-part of Ser. No. 409,745, Aug. 19, 1982.

[30] Foreign Application Priority Data

Dec. 2, 1981 [GB] United Kingdom ............... 8136371
Oct. 19, 1982 [GB] United Kingdom ............... 8229812

[51] Int. Cl.$^3$ ............... C07C 125/06; C07D 471/04; C07D 213/22
[52] U.S. Cl. ............... 560/24; 560/25; 546/88; 546/260; 502/339; 568/17
[58] Field of Search ............... 560/24, 25; 568/17; 546/88, 260; 502/339

[56] References Cited

U.S. PATENT DOCUMENTS 3,448,140 6/1969 Gamlen et al. ............... 560/25
4,227,008 10/1980 Miyata et al. ............... 560/25
4,319,035 3/1982 Mérger et al. ............... 560/25
4,411,820 10/1983 Pretzer et al. ............... 560/24

Primary Examiner—Natalie Trousof
Assistant Examiner—Bruce D. Gray

[57] ABSTRACT

Process for the preparation of carbamates and/or derivatives thereof by reacting an organic compound containing at least one hydroxyl group with carbon monoxide and an organic nitrogeneous compound in the presence of a catalytic system based on palladium and a ligand according to the general formula:

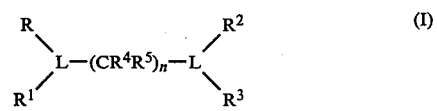

wherein L=N, P, As or Sb; R, $R^1$, $R^2$ and $R^3$ are (un)-substituted alkyl, aryl, alkaryl or aralkyl or R and $R^1$ and/or $R^2$ and $R^3$ may form a ring together with the atom L to which they are attached; $R^4$ and $R^5$ are H or lower alkyl and n=2, 3 or 4, whereas carbon atoms between the groups L may be part of cyclic or non-cyclic unsaturated structures, and in the presence of an acid promoter.

17 Claims, No Drawings

PREPARATION OF CARBAMATES

This application is a continuation-in-part of application Ser. No. 409,745, filed Aug. 19, 1982.

FIELD OF THE INVENTION

The present invention relates to a process for the preparation of carbamates or derivatives thereof from certain organic nitrogeneous compounds, carbon monoxide and organic hyroxyl-froup containing compounds in the presence of a palladium-based catalyst and an acid promoter.

BACKGROUND OF THE INVENTION

Carbamates are important chemicals, particularly since they can be converted easily into the corresponding isocyanates which are valuable and versatile starting materials, e.g. for the production of polyurethanes and related compounds.

Numerous attempts have been made over the years to find alternative routes to the well-known preparation of isocyanates (or their precursors the carbamates), especially the most important ones such as toluene diisocyanate (TDI) and methylene-4,4'-diphenyl diisocyanate (MDI) via the so-called "phosgene route". Reference is made in this respect to "Recent Advances in Isocyanate Chemistry" by S. Ozaki (Chem. Rev., 72 (1972) 457–496).

Much emphasis has been laid on the reduction of aromatic nitrocompounds with carbon monoxide and a lower alkanol in the presence of a sulphur, selenium or tellurium catalyst. A seemingly unavoidable disadvantage of such process is the presence of small but definite amounts of catalyst (especially selenium or selenium compounds) in the product so that even more research is devoted to solve the impurity problem.

Another approach is based on the use of a Group VIII metal compound or complex as catalyst together with one or more co-catalysts. Reference is made in this respect to U.S. Pat. No. 3,448,140, issued June 3, 1963, disclosing inter alia the use of a catalyst comprising iridium, rhodium, platinum, palladium, molybdenum or iron and a ligand together with a molar excess of ferric chloride as co-catalyst, and to U.S. Pat. No. 2,903,950 disclosing the use of a co-catalyst system based on iron oxide and/or iron oxide hydrate together with specific chlorides (particularly FE(II)chloride and/or FE(III)-chloride complexes or hydrochlorides of tertiary amines. It is clear from the art that a promoter based on a salt of a metal which can exist in two or more valencies, notably iron, is not only essential but, moreover, also has to be used in a substantial molar excess calculated on the main catalyst. Even more complex catalytic systems have been proposed to remedy substantial corrosion problems inherent to the use of ferrous or ferric chloride.

SUMMARY OF THE INVENTION

The present invention relates to a process for the preparation of carbamates and/or derivatives thereof by reacting an organic compound containing at least one hydroxyl group with carbon monoxide and at least one of an organic nitrogeneous compound containing at least one non-cyclic group in which a nitrogen atom is directly attached to a single carbon atom or through a double bond to an oxygen atom or a nitrogen atom in the presence of a catalytic system based on palladium and/or a palladium compound and a Group VA ligand, using a ligand according to the general formula:

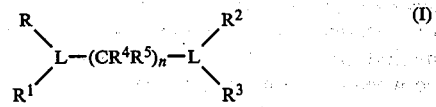

wherein each L which may be the same or different, represents a nitrogen, phosphorus, arsenic or antimony moiety; R, $R^1$, $R^2$ and $R^3$ which may be the same or different, each represent an alkyl, aryl, alkaryl or aralkyl group which may be substituted by one or more inert substituents or R and $R^1$ and/or $R^2$ and $R^3$ may form a ring structure together with the atom L to which they are attached; $R^4$ and $R^5$ which may be the same or different, each represent a hydrogen atom or a lower alkyl group and n=2, 3 or 4, whereas carbon atoms between the grous L may be part of cyclic or non-cyclic unsaturated structures and further using an acid promoter.

It has been found that carbamates and/or derivatives thereof can be produced with high selectivity without the need of a co-catalyst, let alone a substantial molar excess of co-catalyst calculated on the main catalyst, when an organic nitrogenous compound is reacted with carbon monoxide and an organic hydroxyl group-containing compound in the presence of palladium and a distinct type of ligand, and that both the reaction rate and the selectivity of the process can be increased by carrying out the reaction in the presence of an acid. This favorable effect of the addition of an acid only occurs when the reaction is carried out with the distinct type of ligand using according to the invention, and not with ligands such as, for example, triphenyl phosphine or pyridine.

The process according to the present invention is not only advantageous in that the organic nitrogeneous compound can be converted completely into the appropriate carbamate with selectivities above 90%, but also because neither corrosion problems nor the formation of dimethyl ether as by-product from methanol are of any significance. Furthermore, the recovery of palladium is far less cumbersome than the recovery/separation of small amounts of palladium or other Group VIII metals from large amounts of iron compounds when using the multi-metal catalytic systems referred to hereinbefore. Another important feature of the process of the invention is that it enables the preparation of carbamates from nitrogenous compounds and CO under moderate conditions in a high yield and with a high reaction rate. In view of this the process is of great practical interest.

DESCRIPTION OF THE PREFERRED EMBODIMENT

The process according to the present invention relates in particular to the use of ligands according to formula I wherein L represents a nitrogen or a phosphorus atom; R, $R^1$, $R^2$ and $R^3$ are as defined hereinbefore; $R^4$ and $R^5$ which may be the same or different, each represent a hydrogen atom or a methyl group, and n=2, 3 or 4, whereas carbon atoms between the groups L may be part of cyclic or non-cyclic unsaturated structures.

Preference is given to the use of ligands according to the general formula I wherein L represents a nitrogen or a phosphorus atom; R, R$^1$, R$^2$ and R$^3$ which may be the same or different, each represent an (alk)aryl group which may contain one or more halogen, alkoxy or aryloxy substituents; R$^4$ and R$^5$ which may be the same or different, each represent a hydrogen atom or a methyl group, and n=2, 3 or 4 whereas carbon atoms between the groups L are part of cyclic structures when L represents a nitrogen atom.

The specific ligands to be used in the process according to the present invention belong to the general class of bidentate ligands, i.e. complexing groups or molecules which contain two hetero atoms through which bonds with the metal may be formed.

Examples of ligands according to the general formula I wherein L represents a phosphorus moiety are tetramethyl diphosphinoethane, tetramethyl diphosphinopropane, tetraethyl diphosphinoethane, tetrabutyl diphosphinoethane, dimethyl diethyl diphosphinoethane, tetraphenyl diphosphinoethane, tetraperfluorophenyl diphosphinoethane, tetraphenyl diphosphinopropane, tetraphenyl diphosphinobutane, dimethyl diphenyl diphosphinoethane, diethyl diphenyl diphosphinopropane, tetratolyl diphosphinoethane, ditolyl diphenyl diphosphinoethane, tetratrifluoromethyl diphosphinotetrafluoroethane, tetraphenyl diphosphinoethene and derivatives thereof and 1,2-bis(diphenylphosphino)benzene and derivatives thereof. Preference is given to the use of tetraphenyl diphosphinoethane, tetraphenyl diphosphinopropane and tetraphenyl diphosphinobutane, in particular to tetraphenyl diphosphinoethane and tetraphenyl diphosphinopropane.

Examples of ligands according to the general formula I wherein L represents a nitrogen atom are 1,2-bis(dimethylamino)ethane, 1,2-bis(diethylamino)ethane, 1,2-bis(dimethylamino)propane, 1,2-bis(di-t.butylamino)ethane, 1,2-bis(diphenylamino)ethane, 1,2-bis(diphenylamino)propane, 1,2-bis(diphenylamino)butane, 2,2'-bipyridine, 2,2'-biquinoline, bispyridylglyoxal, and 1,10-phenantroline and derivatives thereof. Preference is given to the use of 2,2'-bipyridine and 1,10-phenantroline.

Examples of ligands according to the general formula I wherein L represents an arsenic or antimony atom comprise tetraphenyl diarsaethane, tetraphenyl distibaethane and derivatives thereof.

Examples of inert substituents which may be present in ligands according to the general formula I comprise fluorine or chlorine atoms, alkoxy or aryloxy groups, in particular methoxy or phenoxy groups, cyano groups as well as groups —LR'R$^1$ and/or —LR$^2$R$^3$ wherein L and R, R$^1$, R$^2$ and R$^3$ are as defined hereinbefore. It should be noted that in compounds according to the general formula I which contain additional substituents —LR'R$^1$ and/or —LR$^2$R$^3$, at least two of the L moieties present are considered to exert the metal —L bonding.

As stated hereinbefore, the carbamates are prepared from organic nitrogeneous compounds, i.e. compounds containing at least one non-cyclic group in which a nitrogen atom is directly attached to a single carbon atom and through a double bond to oxygen or another nitrogen atom such as organic nitro, nitroso, azo or azoxy compounds. Preference is given to aliphatic and, in particular, aromatic mono and polynitro compounds.

Examples of aromatic nitrocompounds include nitrobenzene, alkyl and alkoxy nitrobenzenes, aryl and aryloxy nitrobenzenes, dinitrobenzenes, alkyl and alkoxy, aryl and aryloxy dinitrobenzenes such as 2,4-dinitrotoluene, 2,6-dinitrotoluene and 4,4'-dinitrodiphenylmethane, and polynitrobenzenes. Examples of aliphatic nitrocompounds include nitromethane, nitroethane, 2,2-dimethylnitrobutane, nitrocyclopropane, 3-methyl nitrobutane, phenyl nitromethane, p-bromophenyl nitromethane, p-methoxyphenyl nitromethane, dinitroethane and dinitromethyl cyclohexane. Preferred organic nitro compounds are nitrobenzene, m-dinitrobenzene, nitrotoluene, 2,4-dinitrotoluene, 2,6-dinitrotoluene and 4,4'-dinitrodiphenylmethane.

Examples of nitroso compounds comprise aromatic nitrosocompounds such as nitrosobenzene, nitrosotoluene, dinitrosobenzene and dinitrosotoluene as well as aliphatic nitrosocompounds such as nitrosobutane and nitrosocyclohexane.

Examples of azo compounds which can be used as starting materials in the process according to the present invention comprise azobenzene, nitroazobenzene, chloroazobenzene as well as alkyl and aryl substituted azobenzenes.

Examples of azoxy compounds which may be used as starting materials in the process according to the present invention include azoxybenzene, nitroazoxybenzene, chloroazoxybenzene as well as alkyl and aryl substituted azoxybenzenes.

Mixtures of two or more organic nitrogeneous compounds belonging to the same or different classes as defined hereinbefore can also be applied, e.g. a mixture of two dinitrotoluenes or a mixture of a nitro compound and an azoxy compound.

It has further been found that the preparation of carbamates from organic nitrogeneous compounds containing a nitrogen-oxygen bond, in particular from aromatic nitro compounds, can even be improved further when the reaction is carried out in the presence of a primary or secondary amine or a urea (derivative). The conversion of the organic nitrogeneous compound can be increased while maintaining a high selectivity towards the desired carbamate, the primary or secondary amine or urea (derivatives) being co-converted into the desired carbamate.

Primary amines according to the general formula R$^6$NH$_2$ wherein R$^6$ represents a substituted or unsubstituted alkyl, aryl, alkaryl, aralkyl or cycloalkyl group can be suitably applied. Preference is given to the use of primary amines containing up to 14 carbon atoms, especially to the use of aromatic primary mono and diamines having of from 6 to 13 carbon toms such as aniline, p-aminotoluene, 2,4-diaminotoluene, 2,6-diaminotoluene and 4,4'-methylene dianiline. Very good results have been obtained using aniline as a co-reactant.

It has been found that the presence of a primary amine may lead to the production of urea derivatives. For instance, when the reaction between nitrobenzene, carbon monoxide and methanol is carried out in the presence of aniline and at a rather low temperature, i.e. a temperature between 90° C. and 120° C., a high amount of 1,3-diphenylurea is produced which can be isolated as such. When raising the temperature to 130° C.-150° C., it appears that the 1,3-diphenylurea produced is converted quantitatively into the expected carbamate. Carefully tuning the reaction conditions thus has the additional benefit that the product ratio between urea derivative and carbamate can be controlled either way.

Urea (derivatives) can also be used as co-reactants in the process according to the present invention. Examples of suitable urea derivatives comprise dialkyl and diaryl ureas, especially symmetrical diaryl ureas such as diphenylurea and di-p-tolylurea, in particular diphenylurea.

The amount of primary or secondary amines or urea (derivatives) to be used in conjunction with the organic nitrogeneous compound referred to hereinabove is not very critical and can vary between rather wide limits. Ratios in the range of from 1 to 10 to 10 to 1 mol amine or urea (derivative) per mol organic nitrogeneous compound can be suitably applied.

As stated hereinabove, the process according to the present invention is carried out by reacting an organic nitrogeneous compound with carbon monoxide and an organic compound containing at least one hydroxyl group. Mono-or polyhydric alcohols containing primary, secondary or tertiary hydroxyl groups as well as mixtures of such compounds can be used. The organic compounds containing at least one hydroxyl group can be represented by the general formula $R^7(OH)_m$ wherein m is an integer up to 4 and $R^7$ represents a substituted or unsubstituted alkyl, aryl, alkaryl or aralkyl group containing up to 20 carbon atoms, and preferably up to 6 carbon atoms.

Examples of compounds according to the general formula $R^7(OH)_m$ wherein m and $R^7$ are as defined hereinbefore comprise mono-hydric alcohols such as methanol, ethanol, n-propanol, sec-propanol, the butanols, amyl alcohol, hexyl alcohol, lauryl alcohol, cetyl alcohol, benzyl alcohol, chlorobenzyl alcohol, methoxy benzyl alcohol, methoxy ethanol, butoxy ethanol, cyclohexyl alcohol, phenol and the cresols. Examples of polyhydric alcohols comprise diols, e.g. ethylene glycol, diethylene glycol, propylene glycol, dipropylene glycol and triols such as glycerol, trimethylolpropane and hexane triols. Ethers of the polyhydric compounds can also be used provided that they contain at least one free hydroxyl group in the molecule. Preference is given to the use of lower alcohols such as methanol, ethanol, propanol, isopropanol, butanol, sec-butanol, isobutanol, ethylene glycol, glycerol and trimethylolpropane, and particularly to methanol and ethanol.

The ratio of the organic nitrogeneous compound to organic hydroxyl-group containing compound is not critical since any of those compounds can be used in excess to serve as solvent for the process according to the present invention. It has been found convenient to operate the process in the presence of a (large) excess of the organic hydroxyl-group containing compound but the use of an excess of the appropriate organic nitrogeneous compound is by no means excluded. It is also possible to operate the process in the presence of an inert diluent such as an aliphatic or aromatic hydrocarbon, e.g. hexane, benzene or toluene, an halogenated hydrocarbon such as a perfluoroalkane, or a ketone, ester or ether.

The process according to the present invention is carried out in the presence of a catalyst based on palladium. Palladium can be used as such, deposited on an inert carrier such as carbon or alumina, or in the form of palladium compounds, especially palladium salts. Good results can also be obtained when a palladium compound is used which is substantially soluble in the prevailing reaction mixture. Examples of convenient palladium salts include palladium chloride, palladium bromide, palladium iodide, sodium tetrachloropalladate, potassium tetrachloropalladate, potassium tetraiodopalladate, palladium acetate, palladium propionate, palladium isobutyrate, palladium acetylacetonate and similar palladium compounds. Preference is given to the use of palladium salts of organic acids, in particular palladium acetate.

It will be appreciated that the presence of a compound according to the general formula I together with palladium and/or a palladium compound is essential for obtaining the desired carbamates in high yields and with high selectivity.

The amount of palladium or palladium compound to be used in the process according to the present invention is conveniently between 0.011% wt and 10% wt, and particularly from about 0.005% wt to about 3% wt, calculated on the amount of nitrogeneous compound present in the reaction mixture. The use of rather small amounts of palladium compounds, e.g. less than 0.5% wt, calculated on nitrogeneous compound present in the reaction mixture, is preferred. It is very surprising that the use of a co-catalyst is not required, even when very small amounts of palladium compounds are used.

The compounds according to the general formula I should be used in such an amount that the ratio palladium (compound): compound according to the general formula I is conveniently between 0.05 and 50, preferably between 0.1 and 20.

The reaction is also carried out in the presence of an acid promoter which causes an increase of the rate of conversion of the organic nitrogenous compound, and in most cases also an increase of the selectivity to the desired carbonate.

When the atoms L of the ligand represent phosphorus, arsenic or antimony the acid preferably has a $pK_a > 3.5$. Preferred acids are organic acids having a $pK_a > 3.5$, particularly carboxylic acids. Carboxylic acids having 1–6 carbon atoms, particularly acetic acid, are preferred.

When the atoms L of the ligand represent nitrogen the acid preferably has a $pK_a < 3.5$ because in that event stronger acids cause a larger increase of the reaction rate than acids having a $pK_a > 3.5$. Although hydrogen halides, such as HCl, may be used, preference is given to acids which have a $pK_2 < 3.5$ and do not contain halogen anions. Hydrogen halides are less active as promoter and may give rise to corrosion. Examples of suitable acids which do not contain halogen anions are sulfuric, phosphoric, perchloric, fluoboric, fluosilicic and fluosulphonic acid. Sulphonic acids $R^8SO_3H$ in which $R^8$ represents an optionally substituted hydrocarbon group are particularly preferred. The hydrocarbon group may be an alkyl, aryl, aralkyl or alkaryl group having 1–30, preferably 1–14 carbon atoms. The hydrocarbon group may be substituted with, for example, halogen atoms, particularly fluorine atoms. Preferred acids are p-toluene sulphonic acid and trifluormethyl sulphonic acid. The acid $R^8SO_3H$ may also be an ionic exchange resin containing sulphonic acid groups as, for example, Amberlite 252H, the group $R^8$ being a polymeric hydrocarbon group, for example a polystyrene group substituted with sulphonic acid groups.

The amount of acid present in the reaction mixture preferably lies between 0.01 and 150, more preferably between 0.1 and 100, and most preferably between 1 and 50 equivalents per gram atom of palladium. Carboxylic acids such as acetic acid are preferably used in excess calculated on the molar amount of the compound according to the general formula I.

The process according to the present invention can be carried out conveniently at temperatures up to 300° C. Preference is given to the use of temperatures in the range between 75° C. and 200° C., and particularly from about 85° C. to about 150° C. The reaction is normally carried out at super-atmospheric pressure; pressures of up to 500 bar can be applied. Preferably, the process is operated at rather low pressures. Good results can already be obtained using initial pressures between 30 and 70 bar. Mixtures of carbon monoxide and hydrogen up to about 20% wt of hydrogen can also be applied. The presence of hydrogen may cause the in situ formation of an amine from the organic nitrogeneous compound, in particular aniline from nitrobenzene, which may then be converted into the desired carbamate.

The process according to the present invention is of interest for the preparation of monocarbamates or derivatives thereof by reacting a mononitro, mononitroso, monoazo or monoazoxy compound with carbon monoxide and an organic mono-hydroxy compound. The process is further of particular interest for the preparation of polycarbamates or derivatives thereof by reacting a polynitro, polynitroso, nitro-substituted azo or nitro-substituted azoxy compound, preferably 2,4-dinitrotoluene, with carbon monoxide and an organic mono-hydroxy compound.

The process according to the present invention can be carried out batchwise, semi-continuously or continuously. The reaction time is, of course, related to the temperature and pressure adopted. In general, reaction times between 1 and 20 hour appear to be adequate.

The carbamates produced according to the process according to the present invention can be used as such, e.g. as starting materials for agrochemicals, dyes, pharmaceuticals or polyurethanes, or may be converted into the corresponding isocyanates by methods known in the art. A suitable method therefore comprises heating the appropriate carbamate. The present invention therefore also relates to a process for the preparation of organic isocyanates by converting a carbamate and/or derivatives thereof which have been obtained by reacting an organic nitrogeneous compound, carbon monoxide and an organic compound containing at least one hydroxyl group in the presence of a catalytic system based on palladium and a ligand according to the general formula I.

The invention will now be illustrated by means of the following Examples which should not be considered to restrict the scope of the present invention. Variations in process conditions will be understood by those skilled in the art.

EXAMPLE 1

A 300 ml autoclave (Hastelloy C) was charged with nitrobenzene (7.5 ml), methanol (50 ml), palladium acetate (0.7 mmol) and tetraphenyl diphosphinoethane (4 mmol). The autoclave was then pressurized with carbon monoxide (initial pressure 40 bar). The temperature was raised to 135° C. and the reaction mixture was kept at this temperature during 15 hours. The reaction mixture was then allowed to cool and was analysed thereafter using gas-liquid chromatography. The conversion of nitrobenzene amounted to 60% with a selectivity to methylcarbanilate of 82% and to aniline of 18%. The experiment was repeated using twice the amount of tetraphenyl diphosphinoethane. The conversion of nitrobenzene amounted to 85% with a selectivity to methylcarbanilate of 80%.

EXAMPLE 2

The experiment described in Example 1 using 4 mmol tetraphenyl diphosphinoethane was repeated in the presence of acetic acid (10 mmol). The conversion of nitrobenzene amounted to 95% with a selectivity to methylcarbanilate of 92% and to aniline of 8%.

EXAMPLE 3

An experiment as described in the previous Example was carried out but using a smaller amount of nitrobenzene (2.5 ml). From gas-liquid chromatography it appeared that nitrobenzene had been converted completely with a selectivity to methylcarbanilate of 92%.

EXAMPLE 4

An experiment as described in Example 3 was carried out but using 1 g Pd/C (5% wt) instead of palladium acetate. Under otherwise similar conditions the conversion of nitrobenzene amounted to 30% with a selectivity to methylcarbanilate of 90%.

Another experiment was carried out using 1 g Pd/C (5% wt), tetraphenyl diphosphinopropane (0.7 mmol) and acetic acid (16 mmol). After a short reaction time (5 hours) it appeared that the conversion of nitrobenzene amounted to 98% with a selectivity to methyl carbanilate of 97%.

EXAMPLE 5

An experiment as described in Example 2 was carried out using 2,4-dinitrotoluene (5 g, containing 50% wt of water, used as such) instead of nitrobenzene. Under otherwise similar conditions, it appeared that 2,4-dinitrotoluene had been converted completely. Only two products were observed: the desired dicarbamate and the intermediate amino carbamate in a ratio of about 1.

EXAMPLE 6

An autoclave (Hastelloy C) was charged with nitrobenzene (7.5 ml), methanol (50 ml), palladium acetate (0.7 mmol), tetraphenyl diphosphinoethane (4 mmol) and acetic acid (2% wt calculated on total amount of nitrobenzene and methanol). The autoclave was then pressurized with carbon monoxide (initial pressure 60 bar). The temperature was raised to 135° C. and the reaction mixture kept at this temperature during 15 hours. The reaction mixture was allowed to cool and was analyzed thereafter using gas-liquid chromatography. The conversion to nitrobenzene amounted to 95% with a selectivity to methylcarbanilate of 92%.

EXAMPLE 7

The experiment as described in the previous Example was carried out using only 1/10 of the amount of palladium acetate (0.066 mmol) and tetraphenyl diphosphinopropane (0.36 mmol). Moreover, the reaction time was shortened to 5 hours. The conversion of nitrobenzene amounted to 50% with a selectivity to methylcarbanilate of 97%.

EXAMPLE 8

The experiment described in the previous Example was repeated in the additional presence of aniline (2 ml). The conversion of nitrobenzene amounted to 70% and the conversion of aniline amounted to 80%. Both nitrobenzene and aniline had been converted into methylcarbanilate with almost 100% selectivity. No other products were observed.

EXAMPLE 9

The experiment described in Example 7 was repeated using half the amount of palladium acetate (0.033 mmol) and half the amount of tetraphenyl diphosphinopropane (0.18 mmol). The autoclave was pressurized with carbon monoxide and hydrogen (initial partial pressures: carbon monoxides 52 bar and hydrogen 8 bar). The conversion of nitrobenzene amounted to 84% with a selectivity to methylcarbanilate of 70% the remainder of the product being aniline. The experiment was repeated using a quarter of the amount of tetraphenyl diphosphinopropane (0.045 mmol). The conversion of nitrobenzene amounted to 95% with a selectivity towards methylcarbanilate of 70%.

EXAMPLE 10

An autoclave (Hastelloy C) was charged with 2,4-dinitrotoluene (5 g, containing 50% wt of water, used as such), aniline (4 ml), methanol (50 ml), palladium acetate (0.033 mmol), tetraphenyl diphosphinopropane (0.045 mmol) and pressurized with carbon monoxide (initial pressure 60 bar). The temperature was raised to 135° C. and the reaction mixture kept at this temperature among 5 hours. From gas-liquid chromatography it appeared that 2,4-dinitrotoluene had been converted to an amount of 95% and aniline to an amount of 60%. The 2,4-dinitrotoluene was converted with 70% selectivity into the dicarbamate and with 30% into aminocarbamates. Aniline was converted into methylcarbanilate with almost 100% selectivity.

EXAMPLE 11

The experiment as described in Example 10 was repeated at a temperature of 110° C. using nitrobenzene (7.5 ml) and aniline (4 ml) as feed. Gas-liquid chromatography indicated that the initial amount of aniline had been converted completely and that 1,3-diphenylurea had been formed in high yield (90%, based on aniline. Methyl carbanilate had been obtained in 60% yield, based on nitrobenzene with a nitrobenzene conversion of about 70%). The reaction temperature was then raised to 135° C. and the reaction was allowed to proceed at that temperature for another 5 hours. The total conversion of nitrobenzene amounted to 90% and more methylcarbanilate had been formed, corresponding to the amount of 1,3-diphenylurea converted.

EXAMPLE 12

An experiment as described in Example 4 was carried out using 1 g Pd/C (5% wt), tetraphenyl diphosphinopropane (0.17 mmol), acetic acid (16 mmol) and aniline (2 ml). The conversion of nitrobenzene was complete after 5 hours while the conversion of aniline amounted to 50%. Both nitrobenzene and aniline had been converted into methylcarbanilate. No other products were observed.

EXAMPLE 13

An autoclave (Hastelloy C) was charged with nitrobenzene (7.5 ml), methanol (50 ml), palladium acetate (0.1 mmol), 2,2'-bipyridine (4 mmol) and acetic acid (8 mmol). The autoclave was then pressurized with carbon monoxide (initial pressure 60 bar). The temperature was raised to 135° C. and the reaction mixture kept at this temperature for 5 hours. The reaction mixture was allowed to cool and was analyzed thereafter using gas-liquid chromatography. The conversion of nitrobenzene amounted to 66% with a selectivity to methylcarbanilate of 80%. Azoxybenzene was found as a by-product.

EXAMPLE 14

The experiment described in the previous Example was repeated using 1,10-phenanthroline (4 mmol) instead of 2,2'-bipyridine. The conversion of nitrobenzene amounted to 98% with a selectivity towards methylcarbanilate of 91%. Aniline (5%) and azobenzene (4%) were identified as by-product.

EXAMPLE 15

The experiment described in the previous Example was repeated with the additional presence of aniline (2 ml). The conversion of nitrobenzene amounted to 100% and the conversion of aniline amounted to 10%. The selectivity of converted starting material to methylcarbanilate amounted to 94%. Only azobenzene was found as by-product.

EXAMPLE 16

The experiment described in Example 14 was repeated with the additional presence of triethylamine (3 ml). The conversion of nitrobenzene amounted to 100%. Azobenzene was found as main product (63%) together with methylcarbanilate (37%).

EXAMPLE 17

The experiment described in Example 15 was repeated at a reaction temperature of 115° C. 1,3-Diphenylurea was obtained in a yield of 3.3 g together with an 80% yield of methylcarbanilate (based on nitrobenzene intake).

When the experiment described in Example 15 was carried out using 1,3-diphenylurea (2 g) instead of aniline, the nitrobenzene conversion amounted to 95% with a selectivity of 100% to methylcarbanilate. In addition, 1,3-diphenylurea was converted into methylcarbanilate and aniline.

EXAMPLE 18

A 300 ml autoclave (Hastelloy C) was charged with nitrobenzene (7.5 ml), methanol (50 ml), palladium acetate (0.033 mmol), and amounts of ligand and acid as indicated in Table A. The autoclave was then pressurized with carbon monoxide (initial pressure 60 bar). The temperature was raised to 135° C. and the reaction mixture kept at this temperature for the time indicated in Table A. The reaction mixture was allowed to cool and was analyzed thereafter using gas-liquid chromatography. The conversion of nitrobenzene, the selectivity to methylcarbanilate and the reaction rate in g methylcarbanilate per g Pd per hour have been indicated in Table A. Comparative experiments show that notwithstanding the presence of an acid promoter no or hardly any methylcarbanilate is formed when ligands different from those to be used according to the invention, namely triphenyl phosphine, tetraphenyl diphosphino methane, tributyl phosphine or pyridine, are applied. In experiments 9, 10, 12 and 13 0.7 mmol of palladium acetate was used instead of 0.033 mmol.

TABLE A

| Exp. No. | Ligand (mmol) | Acid (mmol) | Reaction time (h) | Nitrobenzene conversion, % | Selectivity to carbamate, % | Reaction rate g carbamate/g Pd/H |
|---|---|---|---|---|---|---|
| 1 | 1,10-Phenanthroline (1.5) | CH$_3$COOH (8) | 2 | 72 | 70 | 787 |
| 2 | 1,10-Phenanthroline (1.5) | pTS* (0.33) | 2 | 98 | 95 | 1454 |
| 3 | 1,10-Phenanthroline (1.5) | CF$_3$SO$_3$H (0.33) | 2 | 100 | 96 | 1500 |
| 4 | 1,10-Phenanthroline (1.5) | H$_3$PO$_4$** (0.33) | 3 | 100 | 92 | 958 |
| 5 | 1,10-Phenanthroline (2.5) | pTS (1) | 1.5 | 100 | 95 | 1979 |
| 6 | 1,10-Phenanthroline (2.5) | HCl*** (1) | 2 | 30 | 60 | 281 |
| 7 | Tetraphenyl diphosphinopropane (3) | CH$_3$COOH (16) | 3 | 40 | 95 | 396 |
| 8 | Tetraphenyl diphosphinopropane (3) | pTS (1) | 5 | 10 | 60 | 37 |
| Comparative experiments | | | | | | |
| 9 | Triphenyl phosphine (4) | CH$_3$COOH (16) | 15 | <10 | 0 | 0 |
| 10 | Tetraphenyl diphosphinomethane (4) | CH$_3$COOH (16) | 15 | <2 | trace | — |
| 11 | Triphenyl phosphine (6) | pTS (1) | 5 | 0 | 0 | 0 |
| 12 | Tributyl phosphine (4) | CH$_3$COOH (16) | 15 | 35 | 56 | 2 |
| 13 | Pyridine (8) | CH$_3$COOH (8) | 5 | <2 | 0 | 0 |
| 14 | Pyridine (8) | pTS (1) | 5 | 0 | 0 | 0 |

*pTS = p-toluene sulphonic acid
**85% aqueous solution
***0.1 ml 37% w HCl

EXAMPLE 19

An experiment as described in Example 18 was carried out using nitrobenzene (7.5 ml), methanol (50 ml), palladium acetate (0.033 mmol), aniline (4 ml), 1,10-phenanthroline (1.5 mmol) and p-toluene sulphonic acid (0.33 mmol). After a reaction time of 3 hours the conversion of nitrobenzene and aniline amounted to 93 and 50% respectively with a yield of methylcarbanilate of 60%. In addition about 4 g of 1,3-diphenylurea were obtained.

EXAMPLE 20

An experiment as described in Example 19 was carried out using 2 g 1,3-diphenylurea instead of 4 ml aniline. After a reaction time of 3 hours the conversion of both nitrobenzene and 1,3-diphenylurea amounted to 100% with a selectivity to methylcarbanilate and aniline of 90 and 10% respectively.

We claim:

1. In a process for the preparation of at least one of carbamates and their derivatives by reacting at a temperature from about 75° C. to about 300° C. an organic compound containing at least one hydroxyl group with carbon monoxide and at least one organic nitrogeneous compound containing at least one non-cyclic group in which a nitrogen atom is attached: (1) directly to a single carbon atom, or (2) through a double bond to an oxygen or a nitrogen atom, in the presence of a catalytic system consisting essentially of palladium and/or a palladium compound and a Group VA ligand, the improvement which comprises utilizing a ligand according to the general formula:

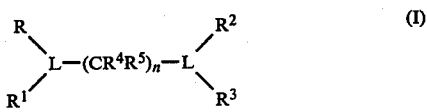

wherein each L which may be the same or different, represents a nitrogen, phosphorus, arsenic or antimony moiety; R, R$^1$, R$^2$ and R$^3$ which may be the same or different, each represent an alkyl, aryl, alkaryl or aralkyl group which may be substituted by one or more inert substituents or R and R$^1$ and/or R$^2$ and R$^3$ may form a ring structure together with the atom L to which they are attached; R$^4$ and R$^5$ which may be the same or different, each represent a hydrogen atom or a lower alkyl group and may form a ring structure together with the atom L and R, R$^1$, R$^2$ and/or R$^3$ and n=2, 3 or 4, and utilizing an organic acid promoter wherein the amount of acid present in the reaction mixture lies between 0.01 and 150 equivalents per gram of palladium.

2. The process of claim 1 wherein R, R$^1$, R$^2$ and R$^3$ are phenyl groups, L is phosphorus, and R$^4$ and R$^5$ are hydrogen.

3. The process of claim 2 wherein the ligand is tetraphenyl diphosphinoethane or tetraphenyl diphosphinopropane.

4. The process of claim 1 wherein the ligand is 2,2'-bipyridine or 1,10-phenanthroline.

5. The process of claim 1 wherein the reaction is carried out in the presence of a primary or secondary amine or a urea (derivative).

6. The process of claim 1 wherein L is phosphorus, arsenic or antimony.

7. The process of claim 6 wherein the acid has a $pK_a > 3.5$.

8. The process of claims 6 or 7 wherein the acid is a carboxylic acid containing 1-6 carbon atoms.

9. The process of claim 1 wherein L is nitrogen.

10. The process of claim 9 wherein the acid has a $pK_a < 3.5$.

11. The process of claims 9 or 10 wherein the acid is a sulphonic acid $R^8SO_3H$, in which $R^8$ represents an alkyl, aryl, aralkyl or alkaryl group having 1-30 carbon atoms.

12. The process of claims 9 or 10 wherein the acid is a sulphonic acid $R^8SO_3H$, in which $R^8$ represents an alkyl, aryl, aralkyl or alkaryl group having 1-14 carbon atoms.

13. The process of claims 9 or 10 wherein the acid is p-toluene sulphonic acid or trifluormethyl sulphonic acid.

14. The process of claim 1 wherein the amount of acid present lies between 0.1 and 100 equivalents per gram atom of palladium.

15. The process of claim 14 wherein the amount of acid present lies between 1 and 50 equivalents per gram atom of palladium.

16. The process of claim 1 wherein the reaction is performed at a temperature between 85° C. and 150° C.

17. The process of claim 1 wherein the reaction is performed at a pressure up to 500 bar.

* * * * *